(12) United States Patent
Fagebaume et al.

(10) Patent No.: US 7,229,668 B2
(45) Date of Patent: Jun. 12, 2007

(54) PROCESS FOR THE ELECTROCHEMICAL PRODUCTION OF A CARBON-CONTAINING MATERIAL WHOSE SURFACE IS MODIFIED WITH ORGANIC GROUPS, AND USE OF THE MODIFIED MATERIAL

(75) Inventors: Olivier Fagebaume, Paris (FR); Jean Pinson, Fontenay Sous Bois (FR); Jean-Michel Saveant, Paris (FR)

(73) Assignee: Centre National de la Recherche Scientifique (C.N.R.S.), Paris (FR)

( * ) Notice: Subject to any disclaimer, the term of this patent is extended or adjusted under 35 U.S.C. 154(b) by 841 days.

(21) Appl. No.: 10/075,369

(22) Filed: Feb. 15, 2002

(65) Prior Publication Data

US 2002/0144912 A1 Oct. 10, 2002

Related U.S. Application Data (63) Continuation of application No. 09/383,959, filed as application No. PCT/FR98/00594 on Mar. 25, 1998, now Pat. No. 6,435,240.

(30) Foreign Application Priority Data

Mar. 27, 1997 (FR) ............................................ 97 03769

(51) Int. Cl.
*B32B 15/08* (2006.01)

(52) U.S. Cl. .................................. 427/249.1; 427/421.1
(58) Field of Classification Search ................. 156/349; 427/419.1
See application file for complete search history.

(56) References Cited

U.S. PATENT DOCUMENTS 5,554,739 A 9/1996 Belmont

FOREIGN PATENT DOCUMENTS

EP 0 569 503 11/1993

OTHER PUBLICATIONS

Balkenhohl, Friedhelm, et al., "Combinatorial Synthesis of Small Organic Molecules," *Angew. Chem. Int. Ed. Engl.*, 35, 1996, pp. 2288–2337.
Balkenhohl, Friedhelm, et al., "Combinatorial Synthesis of Small Organic Molecules," *Angew. Chem. Int. Ed. Engl.*, 35, 1996, pp. 2288–2337.
Frög S., et al., "Organic Chemistry on Solid Supports," *Angew. Chem. Int. Ed. Engl.*, 35, 1996, pp. 17–42.
Thompson, Lorin A., et al., "Synthesis and Applications of Small Molecule Libraries," *Chem. Rev.*, 96, 1996, pp. 555–600.
Hermkens, Pedro H.H., et al., "Solid–Phase Organic Reactions: A Review of the Recent Literature," *Tetrahedron*, 52(13), 1996, pp. 4527–4554.
Hermkens, Pedro H.H., et al., "Solid–Phase Organic Reactions II: A Review of the Literature Nov. 95–Nov. 96," *Tetrahedron*, 53(16), 1997, pp. 5643–2678.

*Primary Examiner*—Richard Weisberger
(74) *Attorney, Agent, or Firm*—Finnegan, Henderson, Farabow, Garrett, & Dunner, L.L.P.

(57) ABSTRACT

Methods for producing by electrochemical reduction a carbon-containing material with its surface modified by organic groups, in particular functionalized organic groups. Certain embodiments of the methods include contacting the carbon-containing material with an organic diazonium salt in solvent, optionally in the presence of an electrolyte and negatively polarizing the carbon-containing material relative to an anode also in contact with an electrolytic solution separate from said diazonium salt solution, wherein the electrochemical reduction is carried out on an organic diazonium salt in protic solvent in an acid medium. Carbon-containing materials with a surface modified by organic groups and the use of these modified materials, for example for producing composite materials or for fixing molecules of biological interest, are taught.

7 Claims, 7 Drawing Sheets

PROCESS FOR THE ELECTROCHEMICAL PRODUCTION OF A CARBON-CONTAINING MATERIAL WHOSE SURFACE IS MODIFIED WITH ORGANIC GROUPS, AND USE OF THE MODIFIED MATERIAL

This is a continuation of application Ser. No. 09/383,959, filed Aug. 27, 1999 now U.S. Pat. No. 6,435,240, which is a continuation of PCT International Application No.: PCT/FR98/00594, filed Mar. 25, 1998, which claims priority of French Application No. 97/03,769, filed Mar. 27, 1997, both of which are incorporated herein by reference.

The present invention relates to a novel process for preparing, by electrochemical reduction, a carbon-containing material whose surface is modified with organic groups, in particular functionalized organic groups, this process comprising placing the carbon-containing material in contact with organic diazonium salt in solvent, optionally in the presence of an electrolyte, and negative polarization of the carbon-containing material relative to an anode which is also in contact with a solution of the said organic diazonium salt or in contact with an electrolytic solution separated by a suitable separator for the solution of the said salt.

The invention also relates to the modified carbon-containing materials obtained by the said process and to the use of these carbon-containing materials, in particular for the preparation of composite materials or for carrying out chemical or biological reactions, or for the complexation of metals.

European patent EP-B-569,503 has already described a process for preparing a carbon-containing material whose surface is modified with aromatic groups, in particular functionalized aromatic groups, by electrochemical reduction.

This process is characterized in that it consists in binding an aromatic group to the surface of this material by electrochemical reduction of a diazonium salt comprising this aromatic group, by placing the carbon-containing material in contact with a solution of the diazonium salt in an aprotic solvent and negatively polarizing the carbon-containing material relative to an anode which is also in contact with the diazonium salt solution.

This document furthermore indicates that, in order for the electrochemical reduction of the diazonium salt to lead to binding of the aromatic group of this salt to the surface of the carbon-containing material, it is necessary to carry out the reduction in an aprotic medium which contains neither any nucleophilic compounds nor any ethylenic compounds nor any species capable of reacting with the neutral radical faster than this radical binds to the carbon-containing surface, and to perform the process at a potential which is more negative than the reduction potential of the diazonium salt.

It has now been found, unexpectedly, that the use of this process in protic solvent in acidic medium leads to the binding of an organic group to the surface of the carbon-containing material.

The process according to the invention is thus characterized in that the electrochemical reduction is carried out on an organic diazonium salt in protic solvent in acidic medium.

The electrochemical reduction can be represented schematically according to the following reaction:

R being an organic residue.

The residue R binds to a carbon atom at the surface of the carbon-containing material. The covalent bond formed is of the type: carbon of the carbon-containing material-carbon of the organic residue.

According to the process of the invention, the cathode potential is set at a value such that the neutral radical R˙ is not reduced and does not give a carbanion. The potential should thus be adjusted to a value which is not too negative, in order to stabilize the neutral radical R˙.

It will be noted that the term "residue" denotes the organic part of the diazonium.

It is understood that the invention covers all diazonium salts whose residues R in radical form will be stable enough to bind to a carbon of the carbon-containing material.

The term "group R" will denote the residue R bound to the carbon-containing material, it being understood that the group R will have a broader meaning than the residue R due to the subsequent chemical conversions which it may undergo, as will be understood in the light of the description which follows.

The invention relates in particular to a process characterized in that the diazonium salt corresponds to the formula:

in which:

Ar is an optionally substituted $C_6$–$C_{14}$ aromatic residue or an optionally substituted heteroaromatic residue of 5 to 14 atoms, comprising one or more hetero atoms chosen from oxygen, nitrogen, sulphur and phosphorus, $X^-$ is an anion chosen from halogens, sulphates, phosphates, perchlorates, tetrafluoroborates, carboxylates and hexafluorophosphates.

The term "aromatic residue" means any residue comprising one or more $C_6$–$C_{14}$ fused or independent benzenic nuclei known per se. Non-limiting examples which may be mentioned are phenyl, naphthyl and anthryl nuclei, triple-fused nuclei, biphenyl nuclei, etc.

The term "heteroaromatic residue" means any aromatic heterocycle comprising one or more hetero atoms such as N, O, S or P, in particular comprising 5 to 14 atoms.

In fact, it is understood that the invention is not limited to specific compounds, but, on the contrary, extends to any diazonium salt which can be reduced to give a neutral radical Ar˙.

Among the aromatic residues which may be mentioned, by way of example, are aromatic residues whose substituents are chosen from the group consisting of:

linear or branched aliphatic radicals optionally comprising one or more double bond(s), optionally substituted with carboxyl, $NO_2$, disubstituted protected amino, monosubstituted protected amino, cyano, diazonium, alkoxy, alkoxycarbonyl, alkylcarbonyloxy or optionally fluorinated vinyl radicals or halogen atoms, aryl radicals optionally substituted with carboxyl, $NO_2$, disubstituted protected amino, monosubstituted protected amino, cyano, diazonium, alkoxy, alkoxycarbonyl, alkylcarbonyloxy or optionally fluorinated vinyl radicals or halogen atoms, carboxyl, $NO_2$, disubstituted protected amino, monosubstituted protected amino, cyano, diazonium, alkoxy, alkoxycarbonyl, alkylcarbonyloxy or optionally fluorinated vinyl radicals or halogen atoms.

As regards the optionally fluorinated vinyl radicals, these should be compatible with the envisaged reaction of the diazonium.

The term "functionalized" means in particular that the aromatic or heteroaromatic or aliphatic radicals, when the aromatic or heteroaromatic radicals are substituted with an aliphatic radical, comprise one or more substituent(s) capable of reacting with a substrate or one or more substituent(s) capable of being converted into substituents capable of reacting with a substrate.

These substituents can thus be very varied depending on the applications for which the carbon-containing materials are intended.

Among the substituents capable of reacting directly with a resin, in particular an organic resin, mention may be made, for example, of —$(CH_2)_n$—COOH, —$(CH_2)_n$—$CH_2$—OH and $(CH_2)_n$—$NH_2$ groups, n being an integer between 0 and 10, and —CH=$CH_2$ and —CF=$CF_2$ groups.

Among the precursor substituents which, after conversion, are capable of reacting with a resin, in particular an organic resin, mention may be made, for example, of $NO_2$, $N_2^+$, $(CH_2)_n$—CN, $(CH_2)_n$—CHO and $(CH_2)_n$—COOPr groups, Pr being a protecting group, and $(CH_2)_n$—NHP'r, $(CH_2)_n$—$N(P'r)_2$ and $(CH_2)_n$—N=P''r groups, P'r and P''r being protecting groups and n being an integer between 0 and 10.

Among the substituents capable of reacting directly with a biological molecule, mention may be made of —$(CH_2)_n$—COOH and —$(CH_2)_n$—$NH_2$ groups, n being an integer between 0 and 10.

Among the precursor substituents which, after conversion, are capable of reacting with a biological molecule, mention may be made of $NO_2$, $N_2^+$, $(CH_2)_n$—CN, $(CH_2)_n$—CHO and $(CH_2)_n$—COPr groups, Pr being a protecting group and n being an integer between 0 and 10.

Among the substituents capable of reacting directly with functional organic molecules, mention may be made of $NO_2$, $(CH_2)_n$—$CONH_2$, $(CH_2)_n$—CN, $(CH_2)_n$—CHO, $(CH_2)_n$—COOH, $(CH_2)_n$—$CH_2OH$ and $(CH_2)_n$—$NH_2$ groups, n being an integer between 0 and 10, and $SO_2H$, $SO_3H$, $SO_2R$ and $SO_3R$ groups, R being an aliphatic or aromatic carbon-containing chain of 1 to 20 carbon atoms.

Among the precursor substituents which, after conversion, are capable of reacting with functional organic molecules, mention may be made of $NO_2$, $(CH_2)_n$—$CONH_2$ and $(CH_2)_n$—COOPr groups, Pr being a protecting group, and $(CH_2)_n$—NHP'r, $(CH_2)_n$—$N(P'r)_2$ and $(CH_2)_n$N=P''r groups, P'r and P''r being protecting groups, and $(CH_2)_n$—CN, $(CH_2)_n$—CHO, $(CH_2)_n$—COOH and $(CH_2)_n$—$CH_2OH$ groups, n being an integer between 0 and 10, and $SO_2Pr$ and $SO_3Pr$ groups, Pr being a protecting group chosen from the meanings of R.

Besides the functional substituents, the aromatic or heteroaromatic residues can comprise one or more unreactive substituents such as alkyl or alkenyl radicals.

The term "alkyl radical" or "alkenyl radical" means, in particular, linear or branched radicals comprising 1 to 20 carbon atoms, optionally one or more hetero atom(s), and optionally one or more double bond(s). These radicals can also comprise one or more halogen atom(s). By extension, the radicals also comprise cycloaliphatic radicals.

By way of example, mention is made of the following diazonium salts:

Compound 1: 4-nitrobenzenediazonium tetrafluoroborate

Compound 2: 3,3'-dimethoxybiphenyl-4,4'-bis(diazonium) dichloride of formula:

(Fast Blue B crystallized with a molecule of $ZnCl_2$)

Compound 3: 4-carboxymethylbenzenediazonium tetrafluoroborate

Compound 4: 1,4-benzenebis(diazonium) tetrafluoroborate

Compound 5: chlorobenzyl-4-diazonium tetrafluoroborate.

Other examples of diazonium salts which can be used in the present invention are chosen from 4-chloromethylphenyldiazonium, 4-hydroxymethylphenyldiazonium, 4-carboxyphenyldiazonium, 4-formylphenyldiazonium, 4-acetylphenyldiazonium, 4-isothiocyanatophenyldiazonium, 4-N-FMOC-aminomethylphenyldiazonium, 4-(4-hydroxymethylphenoxymethyl)phenyldiazonium, 4-(2,4-dimethoxyphenyl-N-FMOC-aminomethyl) phenyldiazonium, 4-(phenyl-N-FMOC-aminomethyl) phenyldiazonium, 4-(4-methylphenyl-N-FMOC-aminomethyl)phenyldiazonium and 4-(4-nitrophenylcarbonyl)phenyldiazonium salts, trityldiazonium chloride, 2-chlorotrityldiazonium chloride, trityldiazonium hydroxide, 9-N-FMOC-aminoxanthen-3-yldiazonium, 4-(2,4-dimethoxyphenylhydroxymethyl)phenyldiazonium, 4-(4-hydroxymethylbenzoyloxymethyl)phenyldiazonium, 4-(4-hydroxymethylbenzoylaminomethyl)phenyldiazonium, 4-(4-hydroxymethyl-3-methoxyphenoxymethyl) phenyldiazonium, etc. salts.

The negative electrode consisting of the carbon-containing material should be at a cathode potential value such that it can donate an electron to the diazonium.

This value can be measured relative to a reference electrode and it is thus understood that this potential value will vary depending on the diazonium salt.

In practice, according to one advantageous process, the cathodic reduction of the diazonium salts is carried out by repetitive cyclic voltammetry in a potential range in which they are reduced or by electrolysis at a potential which is more negative than the reduction potential of the diazonium salt.

Among the protic solvents which may be mentioned, for example, are water, methanol, ethanol or mixtures thereof or mixtures with aprotic solvents, for example acetonitrile, it being understood that this resulting mixture has the characteristics of an aprotic solvent.

According to one preferred embodiment, the solution can optionally comprise an electrolyte such as quaternary ammonium salts or alkali metal salts which are soluble in the medium.

Among these salts, mention may be made of quaternary ammonium or alkaline halides, acetates, tetrafluoroborates, perchlorates and hexafluorophosphates, in particular lithium tetrafluoroborate or a ($C_1$–$C_4$) alkylammonium tetrafluoroborate such as tetraethylammonium tetrafluoroborate.

The electrolyte can be simply an acid chosen from hydrochloric acid, sulphuric acid, nitric acid, nitrous acid, phosphoric acid and tetrafluoroboric acid.

The diazonium salt concentration and electrolyte concentration are generally between $10^{-3}$ mol/l and $10^{-1}$ mol/l for the diazonium salt and between $10^{-2}$ mol/l and 1 mol/l for the electrolyte.

The acids can be chosen from inorganic acids such as hydrochloric acid, sulphuric acid, nitric acid, nitrous acid, phosphoric acid or tetrafluoroboric acid, or organic acids. The pH is advantageously less than 2.

The modified carbon-containing materials are recovered and can be characterized in several ways.

Mention is made of cyclic voltammetry, X-ray photoelectron spectroscopy and tunnelling microscopy.

The measurements taken confirm the binding of the Ar groups to the carbon-containing surface. The surface density of the Ar groups depends on the steric bulk of these groups and will thus vary depending on the Ar groups considered.

By way of example, unexpectedly, it has been found that the electrochemical reduction, under the conditions of the invention, of an aromatic diazonium salt comprising one or more nitro substituents leads directly to binding of the aromatic group and conversion of the nitro group(s) into $NH_2$ group(s) according to the following reaction:

By way of example, 4-nitrobenzenediazonium salts are mentioned.

According to another variant, the carbon-containing conductive materials whose surface has been modified by the process according to the invention are subjected to a subsequent conversion of the functional substituents. For example, the substituents may be converted in order to react with a resin, a biological molecule or a functional organic molecule.

The invention thus covers carbon-containing materials converted after the process according to the invention.

The invention also relates to the carbon-containing materials which can be obtained by the process according to the invention.

According to one variant, these modified carbon-containing materials, in particular made of graphite or of glass carbon, are in the form of fibres, powder, felt, fabric, beads or carbon/carbon composite. When the materials are in the form of fibres, one advantageous application consists in producing improved composite materials of fibres/resin such as an epoxy resin.

The invention also relates to carbon-containing materials modified with groups R in which the substituents are capable of covalently binding metal cations, chemical compounds such as complexing agents or biological molecules, such as proteins and in particular enzymes.

According to one advantageous application, the materials at the surface of which are bound functional organic groups capable of reacting with a biological molecule are used for carrying out biological reactions.

According to another advantageous application, the materials at the surface of which are bound functional organic groups capable of reacting with a complexing or functional organic molecule are used for carrying out such reactions.

One more particularly advantageous application is especially the application of the process according to the invention to combinatorial chemistry. Combinatorial chemistry can be defined as the preparation of a set of molecules known as a "library", it being possible for the number of which to range from a few compounds to several thousands. Combinatorial synthesis constitutes a new strategy for systematically and simultaneously generating a very large number of molecules and studying the structure-activity relationship [F. Balkenhohl et al., *Combinatorial Stnthesis of Small Organic Molecules*, Angew. Chem. Int. Ed. Engl., 1996, 35, pp.2288–2337].

Combinatorial chemistry is usually carried out on a solid support [J. S. Früchtel and G. Jung, *Organic Chemistry on Solid Supports*, Angew. Chem. Int. Ed. Engl., 1996, 35, pp. 17–42]. To date, the supports most commonly used are polystyrene supports, combined with 1–2% of divinylbenzene or of polystyrene/polyethylene glycol (PEG-PS) copolymer [L. A. Thompson and J. A. Ellman, *Synthesis and Application of Small Molecule Libraries*, Chem. Rev., 1996, 96, pp. 555–600]. Thus, another subject of the present invention is the application of the carbon-containing materials obtained according to the electrochemical process as defined above, in combinatorial chemistry, and more particularly the application of the carbon-containing materials at the surface of which are bound organic groups capable of reacting with functional organic molecules to make a library of organic compounds. Such a use is particularly advantageous in the sense that it constitutes an alternative to conventional polymer supports.

In practice, such a use consists in grafting functionalized organic groups as defined above onto a carbon-containing material according to the electrochemical reduction process of the present invention, and then in reacting the said organic groups with various functional organic molecules in order to make a combinatorial chemistry library, and finally in cleaving the compounds obtained from the surface of the carbon-containing material.

The reactions between the organic groups grafted onto the carbon-containing material and the functional organic molecules are all compatible reactions which are known to those skilled in the art.

The carbon-containing materials which can be used more particularly in combinatorial chemistry are those which have an optimum working surface. For example, mention may be made of carbon felts.

In this specific case of the use of the process according to the present invention in combinatorial chemistry, it is understood that it is not limited to the grafting of specific compounds, provided that it concerns an organic diazonium salt in solvent. Many compounds can thus be applied to combinatorial chemistry on a carbon-containing support. Mention may be made, for example, of the following salts: 4-chloromethylphenyldiazonium, 4-hydroxymethylphenyldiazonium, 4-carboxyphenyldiazonium, 4-formylphenyldiazonium, 4-acetylphenyldiazonium, 4-isothiocyanatophenyldiazonium, 4-N-FMOC-aminomethylphenyldiazonium, 4-(4-hydroxymethylphenoxymethyl)phenyldiazonium, 4-(2,4-dimethoxyphenyl-N-FMOC-aminomethyl) phenyldiazonium, 4-(phenyl-N-FMOC-aminomethyl) phenyldiazonium, 4-(4-methylphenyl-N-FMOCaminomethyl)phenyldiazonium and 4-(4-nitrophenylcarbonyl)phenyldiazonium salts, trityldiazonium chloride, 2-chlorotrityldiazonium chloride, trityldiazonium hydroxide, 9-N-FMOC-aminoxanthen-3-yldiazonium, 4-(2,4-dimethoxyphenylhydroxymethyl)phenyldiazonium, 4-(4-hydroxymethylbenzoyloxymethyl)phenyldiazonium, 4-(4-hydroxymethylbenzoylaminomethyl)phenyldiazonium, 4-(4-hydroxymethyl-3-methoxyphenoxymethyl)phenyldiazonium, etc. salts.

Other molecules which can be used are also cited in P. H. H. Hermkens et al., *Solid-Phase Reactions: A Review of the Recent Literature*, Tetrahedron, 1996, Vol. 52, pp. 4527–4554, and P. H. H. Hermkens et al., *Solid-Phase Reactions II: A Review of the Literature* November 1995–November 1996, Tetrahedron, 1997, Vol. 53, pp. 5643–5678.

Among the modified carbon-containing materials which may be mentioned, for example, are those in which the group R corresponds to the formula Ar, Ar being an optionally substituted $C_6$–$C_{14}$ aromatic group or a heteroaromatic group of 5 to 14 optionally substituted atoms comprising one or more hetero atoms chosen from oxygen, nitrogen, sulphur and phosphorus.

The detailed description of these groups is given in the process section of the account of the invention.

According to one variant, the groups Ar are substituted with SH, $SO_2H$, $SO_3H$, $SO_2R$ or $SO_3R$ radicals.

The invention also relates to modified carbon-containing materials made in particular of carbon black, of highly oriented pyrolytic graphite (HOPG) or of glass carbon, which are, according to one variant, in the form of fibres, powders, felt, fabric, beads or carbon/carbon composites.

Preferably, the fibres comprise substituents capable of reacting covalently with radicals present on an organic resin intended to be combined with the said fibres in the form of composite materials.

Needless to say, the nature of these substituents is generally very varied and depends on the organic resin considered.

The invention also relates to the composite materials comprising an organic resin matrix reinforced with modified carbon fibres according to the invention.

The matrix of a composite material can be a thermosetting polymer such as an epoxy resin, or a thermoplastic resin, for example a polyamide, polyethylene or polytetrafluoroethylene resin.

Among the substituents capable of reacting directly with a biological molecule, mention may be made, by way of example, of COOH and $NH_2$ groups.

The process according to the invention can be carried out using a known electrolysis cell, such as the one described in patent EP-B-569,503, FIG. 1 and description page 8, lines 12 to 25, the content of which is incorporated by reference, or using a cell comprising separate compartments.

The examples below illustrate the invention.

All the examples are carried out in an electrolysis cell into which is introduced an electrolyte solution and one of the following diazonium salts:

Compound 1: 4-nitrobenzenediazonium tetrafluoroborate

Compound 2: 3,3'-dimethoxybiphenyl-4,4'-bis(diazonium) dichloride of formula:

(Fast Blue B crystallized with a molecule of $ZnCl_2$)

Compound 3: 4-carboxymethylbenzenediazonium bis(tetrafluoroborate)

Compound 4: 1,4-benzenebis(diazonium) bis(tetrafluoroborate)

Compound 5: chlorobenzyl-4-diazonium tetrafluoroborate.

The acidic aqueous medium used as solvent is water in the presence of hydrochloric acid, sulphuric acid or nitric acid.

In most cases, the acid serves as electrolyte.

The experiments are carried out on glass carbon (GC) electrodes.

The attached figures, which form an integral part of the description, represent cyclic voltamograms of the experiments carried out with the various compounds:

FIGURES

FIGS. 1*a* and 1*b*:

Cyclic voltammetry of compound 1 in 0.1 M sulphuric acid, on GC electrode, sweep speed 0.2 V/s; concentration of compound 1: 1.5 mM (FIG. 1*a*), 1 mM (FIG. 1*b*); saturated calomel reference electrode (SCE); temperature at 20° C.

FIG. 2:

a) Grafting of a GC electrode in a 5 mM solution of 4-nitrobenzenediazonium tetrafluoroborate 1 in 0.1 N HCl.

b) Voltamogram of the same electrode transferred into acetonitrile (ACN)+0.1 M $NEt_4ClO_4$ c) Voltamogram of nitrobenzene in ACN+0.1 M $NEt_4ClO_4$ on a GC electrode. Sweep speed 0.2 V/s; SCE reference.

FIG. 3:

a) Voltamogram of 4-nitrophenyldiazonium tetrafluoroborate 1 (c=2 mM) on carbon fibre in 0.1 N HCl b) Same carbon fibre after grafting (1 minute at the potential of the wave A), rinsing and transfer into an ACN+0.1 M $NEt_4ClO_4$ solution.

FIG. 4:

Voltamogram of compound 2 (c=1 mM) in 0.1 M HCl on GC electrode. Sweep speed 0.2 V/SCE.

FIG. 5:

Linear cyclic voltammetry on a glass carbon electrode in a solution of $2\times10^{-3}$ M 4-(amino)benzyldiazonium chloride salt+0.1 M tetrabutylammonium tetrafluoroborate+0.1 M hydrochloric acid in acetonitrile. Sweep speed v=200 mV.s$^{-1}$. Curve 1=first sweep, curve 2=second sweep.

FIG. 6:

X-ray photoelectron spectroscopy of the sample of glass carbon plates 1.

FIG. 7:

X-ray photoelectron spectroscopy of the sample of glass carbon plates 2.

EXAMPLES

Example 1

A solution of diazonium 1 at a concentration of 1.5 mM in acidic aqueous medium (0.1 M $H_2SO_4$ or 0.1 N HCl) is subjected to repetitive cyclic voltammetry in the range of the reduction potential of the diazonium salt at a temperature of 20° C. and at a scanning speed of 0.2 V/s.

Under these conditions, 1 shows (FIG. 1b) a first irreversible wave (A) at about 0.1 V/SCE; this wave is broad (width at mid-height 160 mV) and its height corresponds to the transfer of 1 electron (by comparison with the reversible wave of ferrocene). This wave is followed by a second irreversible wave (B) at −0.43 V/SCE corresponding to the consumption of 6 electrons. During the return sweep, an anodic wave (C) appears (Ep(C)=+0.38 V/SCE) to which corresponds a cathodic wave (D) during the second sweep (Ep(D)=+0.30 V/SCE). A similar voltamogram is observed in 0.1 N HCl. The monoelectronic wave A is at about −0.14 V/SCE and the wave B (6 electrons) is at about −0.69 V/SCE.

Figure 1:
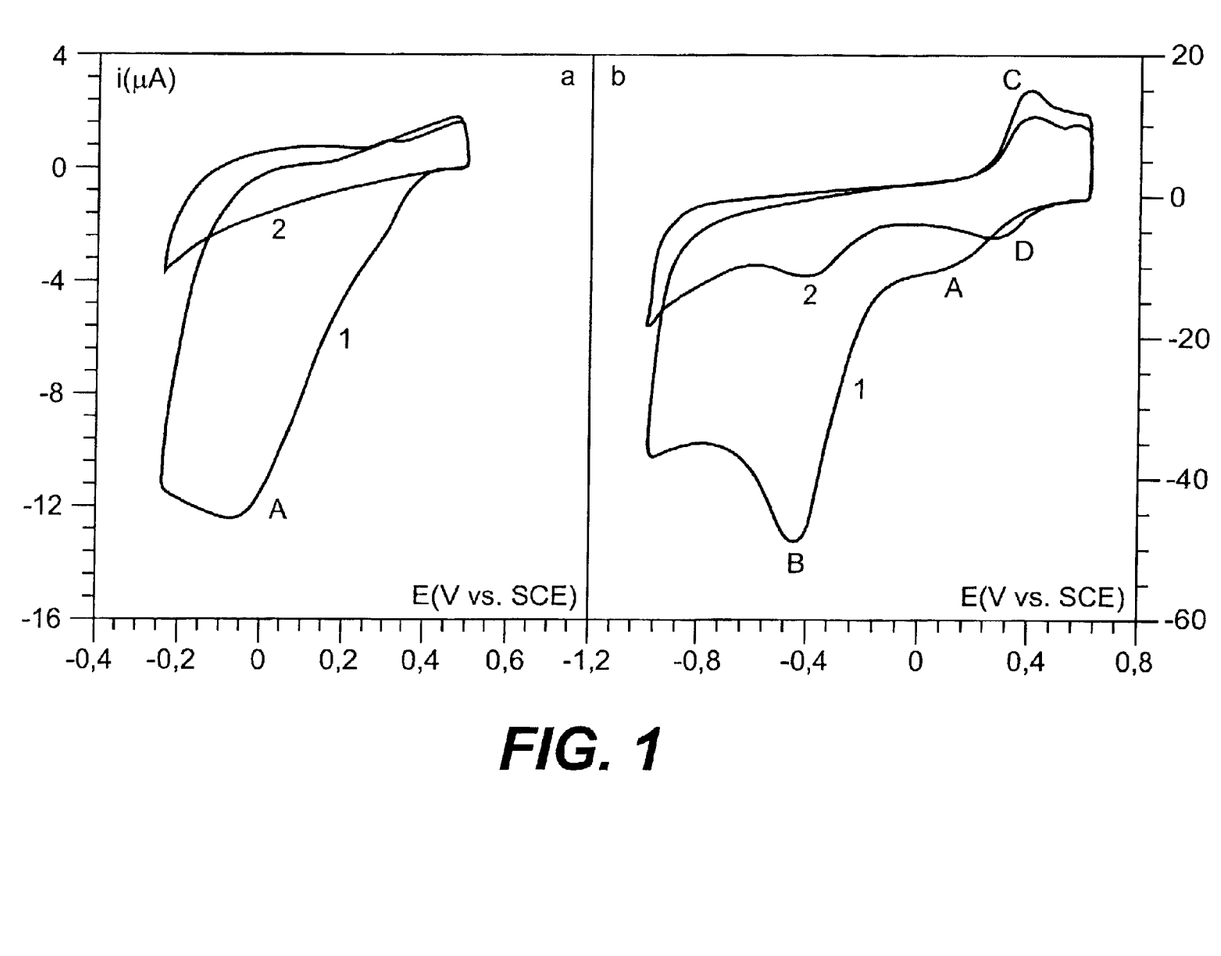

These voltamograms can be interpreted in the following way: by comparison with the results obtained in aprotic medium and with the results described by polarography, the wave A can be attributed to the reaction:

Whereas the wave B can be attributed to the reduction of nitrobenzene into aniline according to the standard mechanism described in protic medium:

In the case studied, the signal corresponds both to the nitrobenzene formed in solution and to the nitrobenzene group grafted onto the surface. The C/D system can be attributed to the phenylhydroxylamine/nitrosobenzene couple. During a second sweep (FIG. 1(b), curve 2), the wave A of 4-nitrophenyldiazonium tetrafluoroborate, corresponding to the reduction of the diazonium function, has disappeared. This phenomenon was already observed during the reduction of diazonium salts in aprotic medium and is observed every time there is grafting of the carbon surface. The decrease of the wave B is also noted during successive sweeps, which indicates that the 4-nitrophenyl groups grafted onto the surface are gradually reduced to 4-aminophenyl groups (which have no reduction wave).

Figure 2:
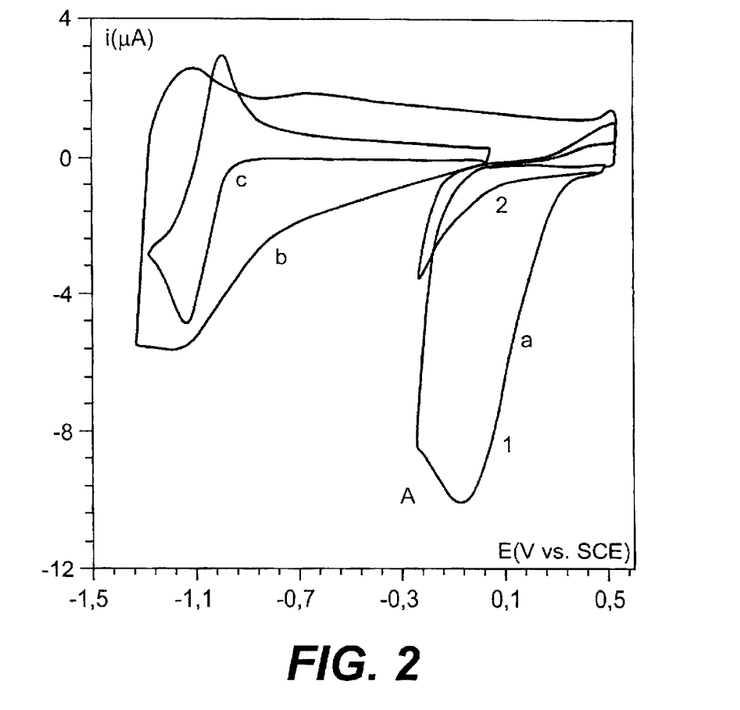

If the potential of the glass carbon electrode is held at −0.25 V/SCE (more cathodic than that of the wave A) (FIG. 2(a)) for one minute, in a 5 mM solution of 4-nitrobenzenediazonium tetrafluoroborate in 0.1 N HCl, the electrode is washed thoroughly with water, with alcohol and with acetone (5 minutes in an ultrasound tank in each solvent) and it is then transferred into a solution of ACN+0.1 M NEt$_4$ClO$_4$, (FIG. 2(b)), then the reversible signal of the 4-nitrophenyl group is observed at about E°=−1.15 V/SCE, i.e. at the same potential as that of the nitrobenzene itself (FIG. 2(c)).

This reversible system decreases during the successive sweeps (probably following protonation of the nitrobenzene radical anion with residual proton donors in the solution).

This set of results shows that, in an acidic aqueous medium, grafting of a 4-nitrophenyl group is observed as follows:

When the electrode is transferred into ACN+0.1 M NEt$_4$ClO$_4$, the same reversible voltamogram due to the grafted 4-nitrophenyl group as that which is observed when the grafting is carried out in ACN medium is observed. On the other hand, if the electrode is left in acidic aqueous medium, six-electron reduction of the nitro group into an amino group is observed during the cathodic sweep:

according to the mechanism described above.

The grafting can be confirmed by X-ray photoelectron spectroscopy (XPS). Table 1 shows the XPS analysis of a clean, untreated GC plate and of the same plate electrolysed at −0.1 V/SCE in a solution of 5 mM 4-nitrobenzenediazonium tetrafluoroborate in 0.1 N HCl and rinsed thoroughly with water, ethanol and acetone (five minutes in an ultrasound tank in each solvent).

TABLE 1

XPS analyses of GC plates

| Element | C % | O % | N % | N % | Cl % |
|---|---|---|---|---|---|
| Peaks (eV) | 285 | 533 | 400 | 406 | 201 |
| Clean plate | 95 | 5 | 0.2 | 0 | 0 |
| Plate grafted in 0.1 N HCl | 84 | 10 | 2.6 | 2.4 | 0 |
| Plate grafted and then treated with epichlorohydrin | 81 | 15 | 1.6 | 0.8 | 1.2 |

Appearance of the peak 406 eV corresponding to the grafted NO$_2$ group, and also of the peak 400 eV corresponding to the NH$_2$ group, are observed between the clean plate and the grafted plate. The latter increase shows that at −0.1

V/SCE, some of the NO$_2$ groups are already reduced to NH$_2$, as might be expected on examination of FIG. 1b, in which the foot of the wave of reduction of the nitro group is already reached at −0.1 V/SCE.

Figure 3:
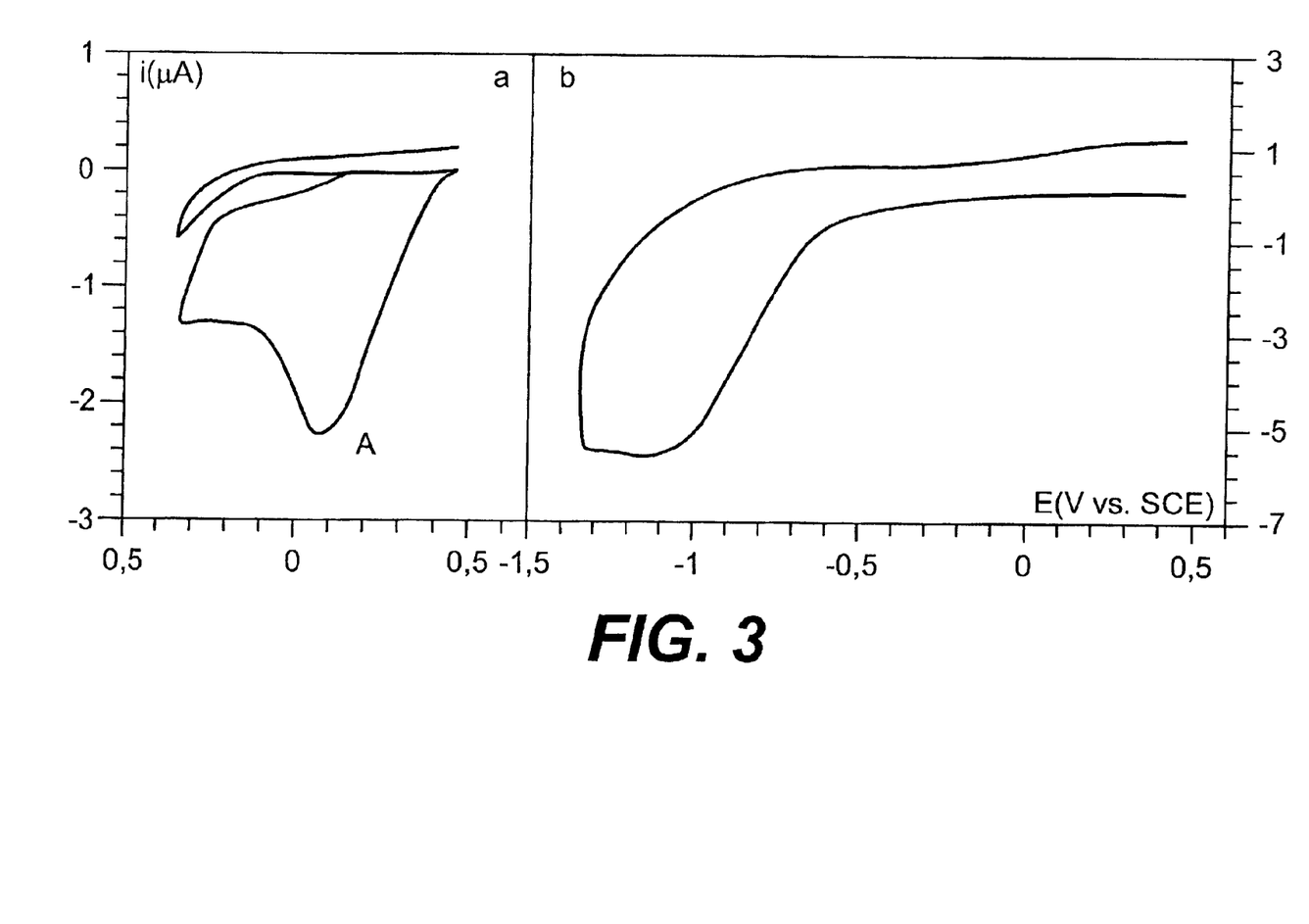

Similar results can be obtained on carbon fibres. By cyclic voltammetry in 0.1 N HCl on a lock containing a few fibres (FIG. 3a), the first wave of the diazonium in (A) is observed at about −0.1 V/SCE. The lock of fibres is grafted at this potential for 1 minute, rinsed as previously in an ultrasound tank and then transferred into an ACN+0.1 M NEt$_4$ClO$_4$ solution. An irreversible wave then appears (FIG. 3b), corresponding to the 4-nitrophenyl group (the irreversibility of the wave is probably due to a residual acidity of the surface of the fibre). The wave for the 4-nitrophenyl group disappears during the successive sweeps, as was already noted on a GC electrode.

TABLE 2

XPS analysis of carbon fibres

| Element | C % | O % | N % | N % | Cl % |
|---|---|---|---|---|---|
| Peaks (eV) | 285 | 533 | 400 | 406 | 201 |
| Clean plate | 80 | 20 | 0 | 0 | 0 |
| Plate grafted in 0.1 N HCl | 86 | 10.5 | 2 | 1 | 0 |
| Plate grafted and then treated with epichlorohydrin | 73 | 23 | 1.2 | 0.1 | 3.7 |

By XPS (Table 2), the appearance of nitrogen peaks corresponding to NH$_2$ at 400 eV and NO$_2$ at 406 eV is observed.

The GC plates and the carbon fibres grafted by electrolysis of 1 in acidic aqueous medium and in which at least some of the nitro groups have been reduced to amino groups during the grafting can be treated with epichlorohydrin to show that the amino groups are indeed capable of reacting with epoxy groups according to the reaction:

The Cl$_{2p}$ signal (which appears in the form of two peaks on account of spin-orbital couplings) should be readily identifiable on the XPS spectra of carbon-containing surfaces. In effect, the appearance of the two peaks corresponding to the Cl$_{2p}$ after the plates or fibres, which have been pregrafted in 0.1 M HCl, have been treated with boiling epichlorohydrin for ten hours is observed.

Example 2

Grafting of a Bis(diazonium) Salt

The reaction is represented schematically in the following way:

Cyclic Voltammetry of Compound 2

In ACN+0.1 M NEt$_4$ClO$_4$, compound 2 shows a very broad wave (width at mid-height 300 mV) at −0.1 V/SCE, corresponding to the transfer of two electrons. This broad, bielectronic wave can be interpreted as the successive reduction of the two diazonium functions at two close but offset potentials. A similar voltamogram is observed in 0.1 M HCl (FIG. 4) with a peak at about −0.3 V/SCE.

Figure 4:
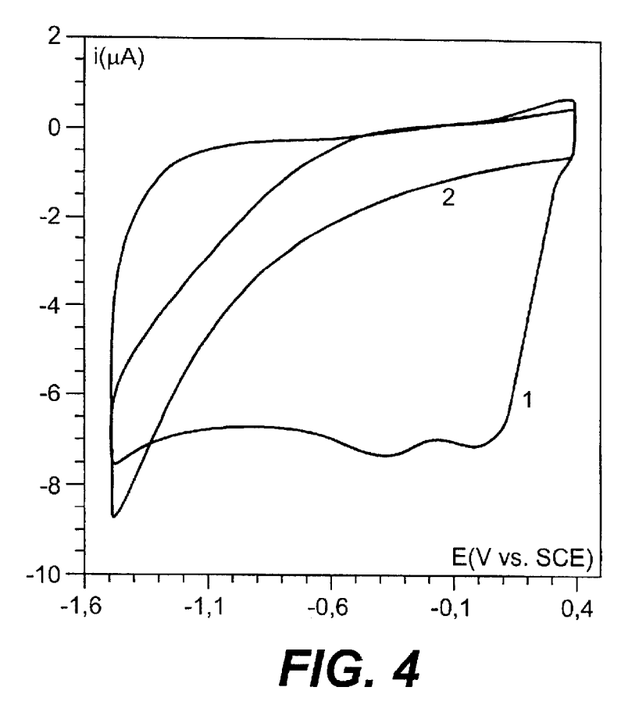

At the second sweep, the wave has disappeared, as is observed each time that there is grafting (FIG. 4, curve 2). In order to observe the presence of aromatic groups on the surface of the carbon, the glass carbon electrode was treated with a nitrating mixture (concentrated HNO$_3$+concentrated H$_2$SO$_4$). In this case, after thorough rinsing and transfer of the electrode into ACN+0.1 M NEt$_4$ClO$_4$, a peak is observed at −1.35 V/SCE, the position of which is compatible with that of a nitroaryl group (for example 4-nitroanisole is reduced at −1.25 V/SCE under the same conditions). By grafting compound 2, it was confirmed that this signal does not appear if the electrode is not premodified.

The grafting of a GC plate can also be monitored by XPS (Table 3):

TABLE 3

XPS analysis of a GC plate grafted with compound 2

| Element | C % | O % | N % | Cl % |
|---|---|---|---|---|
| Peaks (eV) | 285 | 533 | 400 | 201 |
| Clean plate | 94 | 5 | 0.6 | 0.1 |

TABLE 3-continued

XPS analysis of a GC plate grafted with compound 2

| Element | C % | O % | N % | Cl % |
|---|---|---|---|---|
| Plate grafted in 0.1 N HCl | 85 | 13 | 1.5 | 0.2 |
| Plate grafted and then treated with epichlorohydrin | 80 | 17.5 | 0.8 | 1.7 |

The clean plate is grafted in 0.1 N HCl for 30 minutes, rinsed thoroughly as previously and then treated with boiling epichlorohydrin for 10 hours. An increase in the nitrogen peak is observed during grafting of compound 2, but at the same, an increase in the oxygen peak is observed, which appears to indicate an at least partial hydrolysis of the diazonium function not grafted during the treatment. During the reaction with epichlorohydrin, an appreciable increase in the peak corresponding to chlorine is observed, indicating that the reaction has indeed taken place.

Example 3

Grafting of an Aryl Carboxylic Group

It is also shown that it is possible to graft phenylcarboxylic or phenylacetic groups:

These carboxylic groups can react with the amino groups of the resin curing agent (such as diaminodiphenyl sulphone: DDS) according to the reaction below: it being possible for the terminal amino group in turn to react with the epoxy function of the resin.

In 0.1 N hydrochloric acid, the voltamogram of diazonium tetrafluoroborate of 4-phenylacetic acid 3 shows, in reduction an irreversible peak at about −0.8 V/SCE:

Example 4

Study of the Grafting of Compound 5

Study of the Grafting by Cyclic Voltammetry

Figure 5:
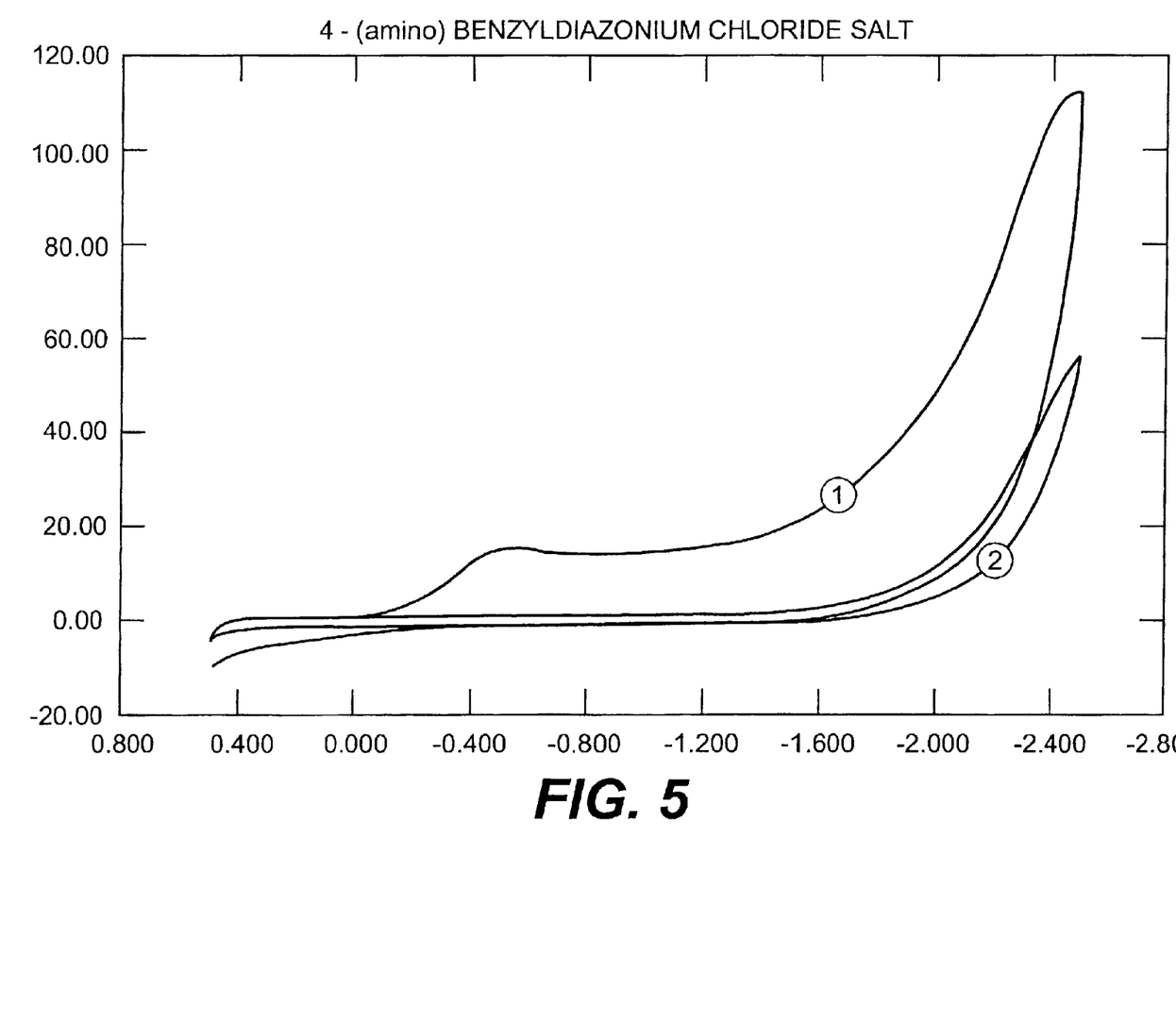

The voltamogram of a glass carbon electrode which is carefully polished and then rinsed by ultrasound in acetone and then ethanol is plotted in a solution of $2 \times 10^{-3}$ M 4-(amino)benzyldiazonium chloride salt+0.1 M tetrabutylammonium tetrafluoroborate in acetonitrile, at a sweep speed $v=200$ mV.s$^{-1}$. The curve comprises an irreversible wave with a peak potential value Ep=−0.53 V/SCE, which disappears from the second sweep onwards (FIG. 5).

Study of Grafting on Glass Carbon Plates

Two samples of glass carbon plates grafted by reduction of the 4-(amino)benzyldiazonium chloride salt are prepared in the following way:

After careful polishing and washing with ultrasound in acetone and then ethanol, each of the glass carbon plates is grafted for 5 minutes at a potential of −0.53 V/SCE, in a solution of $2 \times 10^{-3}$ M 4-(amino)benzyldiazonium chloride salt+0.1 M tetrabutylammonium tetrafluoroborate+0.1 M hydrochloric acid in acetonitrile.

Figure 6:
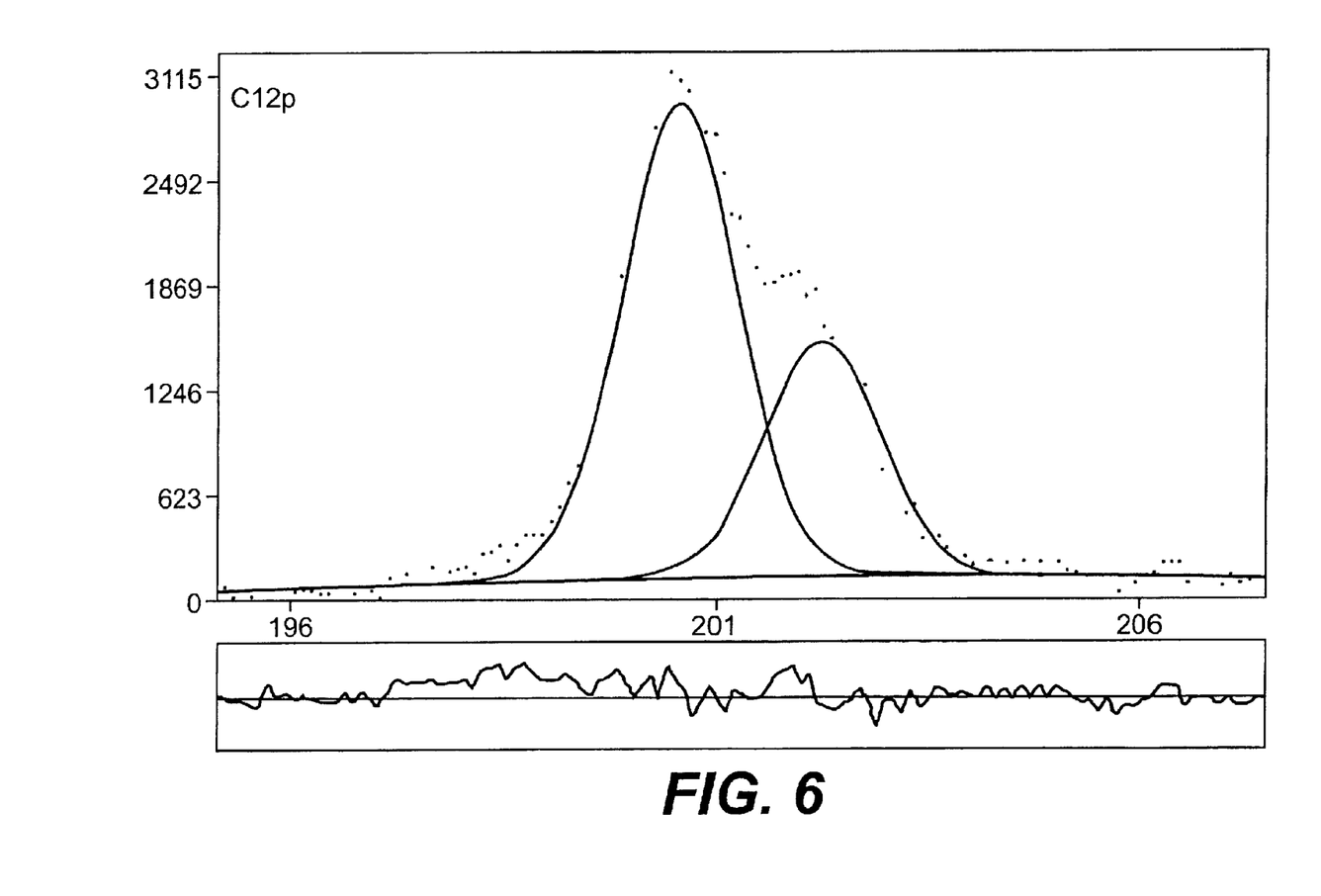
Figure 7:
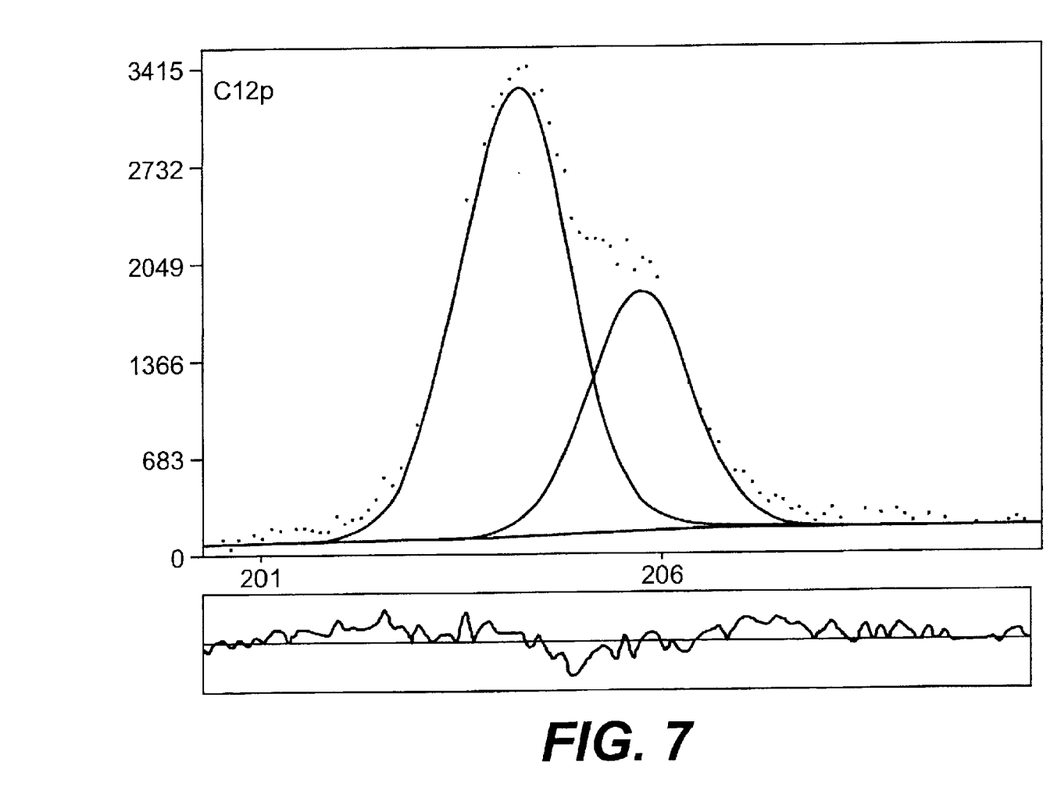

The grafting is then characterized by X-ray photoelectron spectroscopy (FIGS. 6 and 7). The surface of the samples shows a carbon content of 91%, an oxygen content of 6.4% and a chlorine content of 2.6% after grafting. These results show that the grafting of the 4-(amino)benzyldiazonium chloride salt has indeed taken place, according to the following scheme:

What is claimed is:

1. A process for preparing, by electrochemical reduction, a carbon-containing material whose surface is modified with organic groups, which comprises placing the carbon-containing material in contact with an organic diazonium salt in solvent, optionally in the presence of an electrolyte, and negative polarization of the carbon-containing material relative to an anode which is also in contact with the solution of the organic diazonium salt or in contact with an electrolytic solution which is separate from the solution of the salt, wherein the electrochemical reduction is carried out on the organic diazonium salt in protic solvent in acidic medium, and wherein the organic diazonium salt is 4-nitrobenzenediazonium tetrafluoroborate, 3,3'-dimethoxybiphenyl-4,4'-bis(diazonium) dichloride of the following formula:

4-carboxymethylbenzenediazonium tetrafluoroborate, 1,4-benzenebis(diazonium) tetrafluoroborate, chlorobenzyl-4-diazonium tetrafluoroborate, or

- 4-chloromethylphenyldiazonium, 4-hydroxymethylphenyldiazonium, 4-carboxyphenyldiazonium, 4-formylphenyldiazonium, 4-acetylphenyldiazonium, 4-isothiocyanatophenyldiazonium, 4-N-FMOC-aminomethylphenyldiazonium, 4-(4-hydroxymethylphenoxymethyl)phenyldiazonium, 4-(2,4-dimethoxyphenyl-N-FMOC-aminomethyl)phenyldiazonium, 4-(phenyl-N-FMOC-aminomethyl)phenyl-diazonium, 4-(4-methylphenyl-N-FMOC-amynomethyl)phenyldiazonuum or 4-(4-nitrophenylcarbonyl)phenyldiazonium salt, or trityldiazonium chloride, 2-chlorotrityldiazonium chloride or trityldiazonium hydroxide, or

- 9-N-FMOC-aminoxanthen-3-yldiazonium, 4-(2,4-dimethoxyphenyl-hydroxymethyl)phenyldiazonium, 4-(4-hydroxymethylbenzoyloxymethyl)-phenyldiazonium, 4-(4-hydroxymethylbenzoylaminomethyl)phenyldiazonium or 4-(4-hydroxymethyl-3-methoxyphenoxymethyl) phenyldiazonium salt.

2. A process for preparing, by electrochemical reduction, a carbon-containing material whose surface is modified with organic groups, which comprises placing the carbon-containing material in contact with an organic diazonium salt in solvent, also in the presence of an electrolyte, and negative polarization of the carbon-containing material relative to an anode which is also in contact with the solution of the organic diazonium salt or in contact with an electrolytic solution which is separate from the solution of the salt, wherein the electrochemical reduction is carried out on the organic diazonium salt in protic solvent in acidic medium.

3. A process as claimed in claim 2, wherein the electrolyte comprises quaternary ammonium salts or alkali metal salts.

4. A process as claimed in claim 2, wherein the electrolyte comprises quaternary ammonium or alkaline halides, acetates, tetrafluoroborates, perchlorates or hexafluorophosphates.

5. A process as claimed in claim 2, wherein the electrolyte comprises lithium tetrafluoroborate or $(C_1-C_4)$ alkylammonium tetrafluoroborate.

6. A process as claimed in claim 2, wherein the electrolyte comprises tetraethylammonium tetrafluoroborate.

7. A process as claimed in claim 2, wherein the electrolyte comprises hydrochloric acid, sulphuric acid, nitric acid, nitrous acid, phosphoric acid or tetrafluoroboric acid.

* * * * *

UNITED STATES PATENT AND TRADEMARK OFFICE
CERTIFICATE OF CORRECTION

PATENT NO. : 7,229,668 B2
APPLICATION NO. : 10/075369
DATED : June 12, 2007
INVENTOR(S) : Olivier Fagebaume et al.

It is certified that error appears in the above-identified patent and that said Letters Patent is hereby corrected as shown below:

Claim 1, col. 15, line 23, "amynomethyl)phenyldiazonuum" should read --aminomethyl)phenyldiazonium--.

Signed and Sealed this

Sixth Day of November, 2007

JON W. DUDAS
*Director of the United States Patent and Trademark Office*